(12) United States Patent
Palmer (10) Patent No.: US 8,733,834 B2
(45) Date of Patent: May 27, 2014

(54) TRIM ASSEMBLY

(75) Inventor: Mark Palmer, Northamptonshire (GB)

(73) Assignee: Lear Corporation, Southfield, MI (US)

( * ) Notice: Subject to any disclaimer, the term of this patent is extended or adjusted under 35 U.S.C. 154(b) by 294 days.

(21) Appl. No.: 13/172,141

(22) Filed: Jun. 29, 2011

(65) Prior Publication Data

US 2012/0274116 A1 Nov. 1, 2012

Related U.S. Application Data (60) Provisional application No. 61/480,393, filed on Apr. 29, 2011.

(51) Int. Cl.
*A47C 31/02* (2006.01)
*A47C 7/24* (2006.01)

(52) U.S. Cl.
USPC ............... 297/218.5; 297/218.1; 297/218.3; 297/218.4; 297/452.2; 297/452.29; 297/452.65

(58) Field of Classification Search
USPC ........... 297/218.1, 218.2, 218.3, 218.4, 218.5, 297/452.2, 452.29, 452.65
See application file for complete search history.

(56) References Cited

U.S. PATENT DOCUMENTS

| | | | | |
|---|---|---|---|---|
| 3,981,534 A | * | 9/1976 | Wilton | ........................ 297/218.1 |
| 4,643,480 A | | 2/1987 | Morita | |
| 4,789,201 A | * | 12/1988 | Selbert | ........................ 297/218.1 |
| 5,503,454 A | | 4/1996 | Sakamoto | |
| 5,658,046 A | * | 8/1997 | Rus | ............................. 297/378.1 |
| 5,879,055 A | | 3/1999 | Dishner et al. | |
| 5,954,395 A | | 9/1999 | Moulins et al. | |
| 6,027,171 A | * | 2/2000 | Partington et al. | .... 297/452.65 X |
| 6,838,155 B2 | * | 1/2005 | Cappucci et al. | ...... 297/219.1 X |
| 6,899,399 B2 | | 5/2005 | Ali et al. | |
| 6,926,358 B2 | * | 8/2005 | Fujita et al. | .......... 297/452.29 X |
| 7,487,575 B2 | * | 2/2009 | Smith | .................... 297/218.2 X |

(Continued)

FOREIGN PATENT DOCUMENTS

| | | |
|---|---|---|
| DE | 202011100683 | 9/2011 |
| FR | 2891217 A1 | 3/2007 |

(Continued)

OTHER PUBLICATIONS

UK Examination Report dated Apr. 15, 2013 for the corresponding GB Application No. GB12008504, pp. 1-3.

(Continued)

*Primary Examiner* — Rodney B White
(74) *Attorney, Agent, or Firm* — Brooks Kushman P.C.

(57) ABSTRACT

A trim assembly for a seat back of a vehicle seat is provided. The seat back has a seat frame and a seat cushion. The trim assembly includes a backboard securable to the seat frame and adapted to form a rear surface of the seat back. The backboard has a channel formed therein and a plurality of spaced apart retaining windows formed along a length of the channel. A trim cover is adapted to cover the seat cushion and form a front surface of the seat back. The trim cover has a cover material portion and a trim retainer connected to the cover material portion. The trim retainer includes an engagement feature. The trim retainer is insertable into the channel such that the engagement feature cooperates with the retaining windows for securing the trim cover to the backboard.

15 Claims, 4 Drawing Sheets

(56) References Cited

U.S. PATENT DOCUMENTS

| | | | |
|---|---|---|---|
| 8,099,837 B2 * | 1/2012 | Santin et al. ............ | 297/218.2 X |
| 8,376,456 B2 * | 2/2013 | Fujita et al. ........... | 297/452.65 X |
| 2003/0215601 A1 * | 11/2003 | Pedde et al. ......... | 297/452.13 X |
| 2005/0168041 A1 * | 8/2005 | Glance et al. ........ | 297/452.65 X |
| 2008/0084105 A1 | 4/2008 | Behrens | |
| 2009/0033131 A1 | 2/2009 | Clauser et al. | |
| 2009/0121528 A1 | 5/2009 | Oku | |
| 2010/0117434 A1 | 5/2010 | Galbreath et al. | |
| 2013/0119730 A1 * | 5/2013 | Nakagawa et al. ........ | 297/218.1 |

FOREIGN PATENT DOCUMENTS

| | | |
|---|---|---|
| FR | 2956346 A1 | 8/2011 |
| FR | 2956347 A1 | 8/2011 |
| WO | 2010/048515 A1 | 4/2010 |

OTHER PUBLICATIONS

Combined Search and Examination Report dated May 16, 2012 in GB 1200850.4, filed Jan. 19, 2012, 5 pgs.

* cited by examiner

TRIM ASSEMBLY

CROSS-REFERENCE TO RELATED APPLICATIONS

This application claims the benefit of U.S. provisional Application No. 61/480,393 filed Apr. 29, 2011, the disclosure of which is incorporated in its entirety by reference herein.

TECHNICAL FIELD

Various embodiments relate to an assembly and a method of securing a trim assembly to the backboard of a vehicle seat.

BACKGROUND

Vehicle seat assemblies typically include a seat bottom and a seat back pivotally attached to the seat bottom. Back panels may be mounted to a rear surface of the seat back in some applications. The back panel may conceal the rear surface of the seat back and protect the seat back from wear. One example is disclosed in U.S. Pat. No. 5,879,055, issued to Dishner et al.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
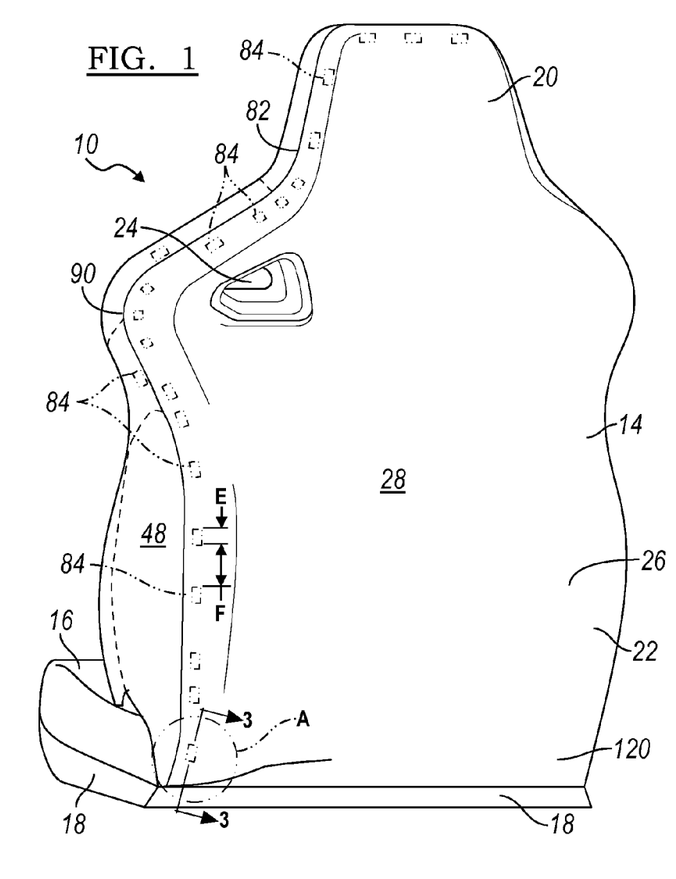
FIG. 1 illustrates a vehicle seat having a seat back and trim assembly according to one embodiment.

Referring now to the figures, FIG. 1 illustrates a vehicle seat assembly 10 having a trim assembly 12. The vehicle seat assembly 10 is provided in a passenger compartment of a vehicle and may be a front seat of a vehicle as shown or may be any suitable vehicle seat.

The vehicle seat assembly 10 includes a seat back 14 and a seat bottom 16. The seat back 14 and seat bottom 16 may be of various constructions, but generally include a seat frame 18 which is covered by foam cushioning 19. The seat back 14 and seat bottom frames 18 may be mounted and secured to the floor or a support frame on the floor of the passenger vehicle. The seat back 14 may be pivotally mounted to the seat bottom 16 to permit a passenger to adjust the seat back relative to the seat bottom 16 or to allow the seat back 14 to be folded in a storage position or to allow the seat back to allow ingress and egress to the vehicle by a passenger.

The seat back 14 may also include a head restraint portion 20. As illustrated in FIG. 1, the seat back 14 may be formed to integrally include the head restraint portion 20 with a seat back portion 22. However, it is contemplated that the head restraint portion 20 and the seat back portion 22 may be formed separately. The seat back 14 may also include other accessories such as a seatbelt guide 24, for example.

The trim assembly 12 includes a backboard 26 and a trim cover 30. As illustrated in FIG. 1, the backboard 26 covers the rear surface 28 of the seat back portion 22 and the head restraint portion 20. It is also contemplated that the backboard 26 may also cover at least a portion of the side surface 48 of the seat back 14 or, alternatively, may only cover a portion of the rear surface 28. In any case, the backboard 26 is adapted to protect the rear surface 28 of the vehicle seat assembly 10 from wear or damage when in use. For example, the seat back 14 may be pivoted relative to the seat bottom 16 to allow passengers' ingress and egress to a backseat of a vehicle, for example, in a two-door vehicle. The rear surface 28 of the seat back 14 may be kicked, brushed, or rubbed by a passenger or cargo being placed in the backseat of the vehicle. In addition to preventing damage to the rear surface of the seat, the backboard 26 also ensures the trim assembly 12 stays assembled.

Some prior art backboard designs rely only on friction and have no means of mechanically retaining the trim cover the back panel of the seatback. Often, prior art back panels are not secure and the seat trim becomes detached. In some prior art designs, separate clips, such as metal clips, are used to help secure the trim cover to the back panel; however, the clips often cause damage, to the trim cover and backboard, especially during assembly or rework processes. Other prior art designs include a channel in the back panel that has an open end, usually towards the lower end of the seat back for assembly purposes, and therefore, the end of the trim retainer is exposed, making the trim retainer susceptible to disengagement, in part due to the nature of the weaker open end of the channel.

The trim assembly 12 is formed by the trim cover 30 being placed over a the front surface 32 of the seat back 14 and secured to the backboard 26 along a rear surface 28 of the seat back 14.

The trim cover 30 includes a cover material portion 42 and a trim retainer 44. The cover material portion 42 may be formed of any suitable material for covering the cushion 19 of the vehicle seat assembly 10 such as cloth, vinyl or leather, for example. The cover material portion 42 may be shaped to cover the front surface 32 of the seat back 14. The trim cover material portion 42 may also be adapted to cover the side surfaces 48 of the seat back 14. The cover material portion 42 may be formed of a single piece of material or alternatively, may be a plurality of material panels joined together to form the cover material portion 42.

Figure 2:
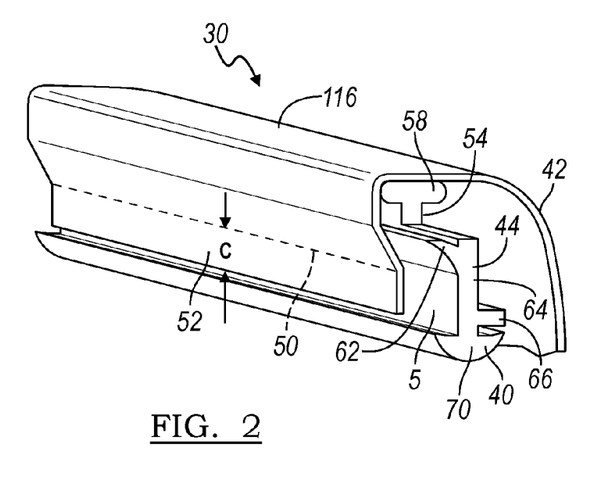
FIG. 2 illustrates a detailed view of a component of the seat back and trim assembly of FIG. 1.

The trim cover 30 also includes a trim retainer 44. The trim retainer 44 may be attached to the cover material portion 42 by any suitable process, such as sewing the trim cover material portion 42 to the trim retainer 44 along a seam 50 as illustrated in FIG. 2. Alternatively, the cover material portion 42 may be joined to the trim retainer 44 through with adhesive or touch fastener or any other fastening mechanism. It is also contemplated that the trim retainer 44 may be integrally formed with the cover material portion 42 as a one-piece trim cover 30.

The trim retainer 44 may be an elongate shape that extends along an edge 52 of the cover material portion 42. In one embodiment, the elongate trim retainer 44 extends continuously along a peripheral edge 52 of the cover material portion 42. Alternatively, the trim retainer 44 may be formed of trim retainer portions, such the portion as shown in FIG. 2, which are attached along the edge 52 of the cover material portion 42.

The trim retainer 44 may be extruded to form the elongate trim retainer 44 having at least one engagement feature 40. In one embodiment, the trim retainer 44 is extruded to have a cross section including an upper first portion 54 and a lower second portion 56. The first portion 54 may include a T-shaped feature 58 along the top 60 of a central stem 64 the trim retainer 44. The first portion 54 may also include at least one engagement feature such as a rib 62 extending from the stem 64. The rib 62 may be a triangular protrusion from a stem 64 of the trim retainer 44. The second portion 56 of the trim retainer 44 may also include at least one engagement feature such as a finger 66. The finger 66 may be a protrusion from the stem 64 of the trim retainer 44 which extends from an opposite side of the stem as the rib 62. The finger 66 may have a generally rectangular cross section along the extruded trim retainer 44. The second portion 26 may also include a second engagement feature 40 such as an anchor member 70 along a bottom 72 of the trim retainer 44. The anchor member 70 may be formed of a pair of projections from both sides of the stem 64. In one embodiment, the anchor member 70 includes a semi-circular cross-section; although it is contemplated that the anchor member 70 may be any shape which corresponds to a channel 80, described in more detail in FIGS. 3-6. The trim retainer 44 further includes a free end portion 74. The free end portion 74 may be formed by removing a section of the upper first portion 54 along the length of the trim retainer 44. As illustrated in FIG. 2, a section of the T-shaped feature 58 is removed to form the free end portion 74. In one embodiment, the free end portion 74 extends beyond the cover material portion 42 so that the cover material portion 42 is not attached along the free end portion 74 of the trim retainer 44.

Figure 3:
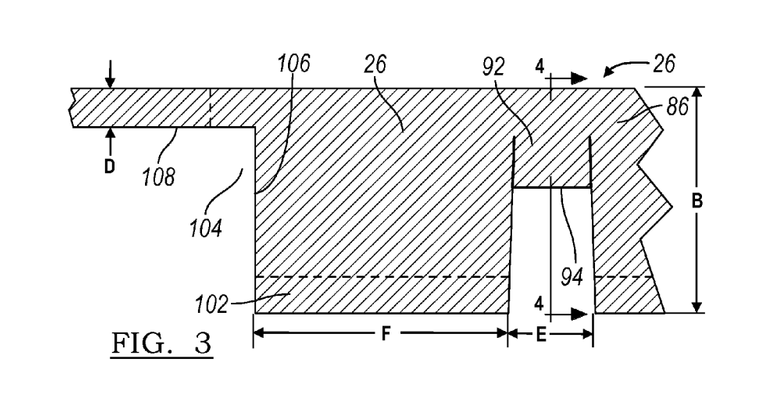
FIG. 3 illustrates a section view of a component of the seat back and trim assembly along section 3-3 of FIG. 1.

Turning now to FIG. 3, FIG. 3 illustrates a cross-section of the backboard 26 along section 3-3 as shown in FIG. 1. The trim assembly includes a backboard 26 covering a rear surface 28 of the vehicle seat assembly 10. The backboard 26 may be injection molded of plastic to form the contoured rear surface 28 of the seat back 14. As such, the backboard 26 is injection molded of plastic or any suitable mold material or composite. Further, the backboard 26 may be generally rigid plastic or composite. The backboard 26 is mounted to the frame 18 to form the rear surface 28 of the seat and conceal the frame 18 and the rear portion of the foam cushion 19 of the vehicle seat assembly 10.

The backboard 26 includes a channel 80 for attaching the trim retainer 44 to the backboard 26. In one embodiment, as illustrated in FIG. 1, the channel 80 is extends continuously along a periphery 82 of the backboard 26. In an alternative embodiment, it is also contemplated that the channel 80 may be formed along an inner region of the seat back 14. The trim assembly 12 is formed by the trim cover 30 being placed over the front surface 32 of the seat back 14 and secured to the backboard 26 along a rear surface 28 of the seat back 14. The trim retainer 44 is insertable into the channel 80 for securing the trim cover 30 to the backboard 26.

FIG. 3 illustrates a cross-section 3-3 along the length of the channel 80 where the trim retainer is not inserted in the channel 80. The channel 80 is integrally formed or molded in the backboard 26 as a groove extending inwardly from the rear surface 28. The channel 80 may be a constant depth B along the length of the channel 80 as the channel 80 extends around the periphery 82 of the backboard 26. In one embodiment, the depth B of the channel 80 is approximately 14 mm deep. In another embodiment, the depth B of the channel 80 may be between 12 mm and 18 mm deep. It is also contemplated that the depth B of the channel may be any depth suitable for retaining the trim retainer 44 while being compatible with the packaging constraints of the vehicle seat assembly 10.

The trim retainer 44 is sized to allow the cover material portion 42 to be securely attached to the stem 64. In one embodiment, as illustrated in FIG. 2, the cover material portion 42 is secured to the trim retainer 44 between the first portion 54 and the second portion 56. The trim retainer 44 may be a soft rubber extruded mold so that the cover material portion 42 may be easily sewn to the trim retainer 44 along a seam 50. However, it is contemplated that the trim retainer 44 may be any suitable material so that the cover material portion 42 may be attached to the trim retainer 44 by a method such as adhesive or Velcro, for example. As further illustrated in FIG. 2, the edge 52 of the trim cover material portion 42 overlaps the trim retainer 44 enough to be able to securely fasten the cover material portion 42 to the trim retainer 44. In one embodiment, the edge 52 of the cover material portion 42 extends past the seam 50 by a distance C of at least 7 mm, although the distance C of the edge 52 of the cover material portion 42 may vary depending on the material or fastening mechanism.

Referring again to FIG. 3, the channel 80 extends inwardly from the rear surface 28 a distance greater than the nominal thickness D of the backboard 26. As illustrated in FIG. 3, the nominal thickness D of the backboard may be approximately 3 mm. However, the nominal thickness D may be any suitable dimension depending on the application and required rigidity of the backboard 26, or other design and packaging characteristics.

The channel 80 includes a plurality of retaining windows 84 formed along the length of the channel 80. The retaining windows 84 are formed at spaced apart locations along the length of the channel 80 in order to cooperate with the trim retainer 44 for securing the trim cover 30 to the backboard 26. The retaining windows 84 may be thru-openings formed in a side wall 86 of the channel 80, or alternatively, the retaining windows 84 may be recesses formed in the side walls 86. It is also contemplated that the retaining windows 84 may be located along an inner side wall 96 or an outer side wall 98 adjacent the periphery 82 of the backboard 26.

The retaining windows 84 may have an opening dimension E which varies along the length of the channel 80 for each of the retaining windows 84. Referring again to FIG. 1, the retaining windows 84 may be spaced apart by enclosed portions 100. The distance F of the enclosed portions, or the distance between the retaining windows 84 may also vary along the length of the channel 80. For example, along a relatively straight portion 88 of the channel 80, the retaining windows 84 may have a dimension E which may be approximately 10 mm wide, where the retaining windows 84 may be spaced apart by a distance of 50 mm to 60 mm along the straight section 88. In contrast, along a curvature portion 90, the dimension E of the retaining windows 84 may be approximately 5 mm wide whereas the distance F between the retaining windows 84 may be 15 mm apart.

It is contemplated that the dimensions E, F may vary depending on the vehicle seat assembly 10 applications and the features of the channel 80. For example, the dimensions E, F may vary along the length of the straight portions 88 or curvature portions 90. The dimensions E, F may also vary due to the radius of curvature of a curvature portion 90 which is required by the shape of a vehicle seat assembly 10. The retaining windows 84 may be space apart a sufficient distance to reduce cost and complexity of the backboard 26 as well as reducing the amount of effort required to assemble the trim retainer 44 to the channel 80. However, the retaining windows 84 are still spaced close enough to ensure an adequate retention force of the retaining windows 84 on the trim retainer 44 as well as ensuring quality appearance of the trim assembly 12 without gaps, wrinkles or other defects in the cover material portion 42. In another embodiment, the distance F between the retaining windows 84 is at least twice the dimension E of the retaining windows 84.

Figure 4:
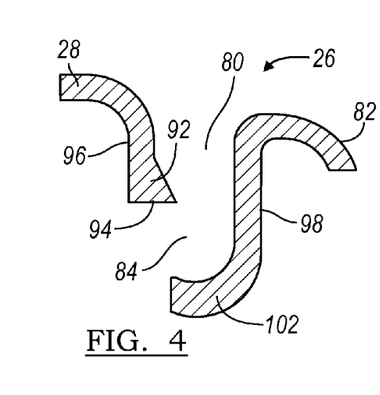
FIG. 4 illustrates a section view of the seat back and trim assembly along section 4-4 of FIG. 3.

Turning now to FIG. 4, FIG. 4 illustrates the section view of the channel 80 taken along section line 4-4 of FIG. 3 which is a cross-section view of the channel 80 through a retaining window 84. In one embodiment, the channel 80 further includes a projection 92. A plurality of projections 92 may be formed and spaced apart along the length of the channel 80. As shown in FIG. 4, a projection 92 extends into the channel 80 from the inner side wall 96 adjacent the retaining window 84 in order to further define the retaining window 84. The projection 92 forms an undercut 94 which may be generally parallel to the rear surface 28 of the backboard 26.

The retaining windows 84 and projections 92 are spaced apart along the length of the channel 80. In one embodiment, the dimension of the projections 92 may be generally equal to the dimension E of the retaining windows 84. In the enclosed portions 100 between the retaining windows 84, the channel 80 may have generally parallel side walls 86 and a generally U-shaped bottom portion 102. The U-shaped bottom portion 102 may be shaped to correspond to the anchor member 70 of the trim retainer 44. The channel 80 further includes an access opening 104 formed along a distal end wall 106 of the channel 80. The access opening 104 is formed adjacent a lower region 120 of the seat back 14.

Figure 5:
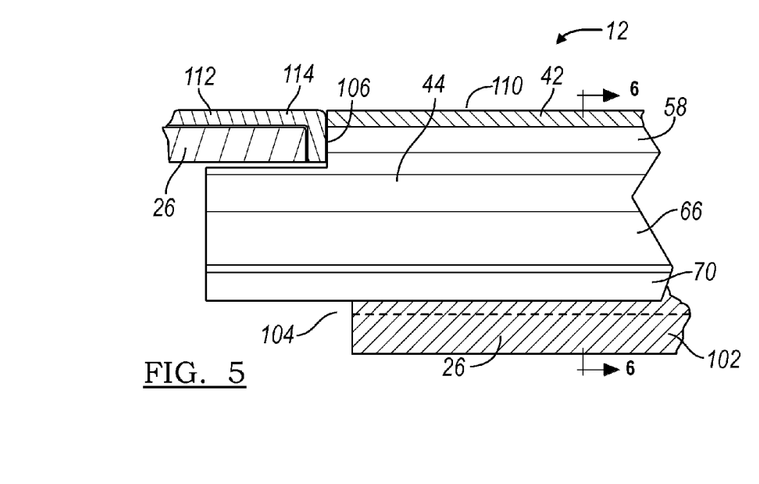
FIG. 5 illustrates a section view of the seat back and trim assembly along section 3-3 of FIG. 1.
Figure 6:
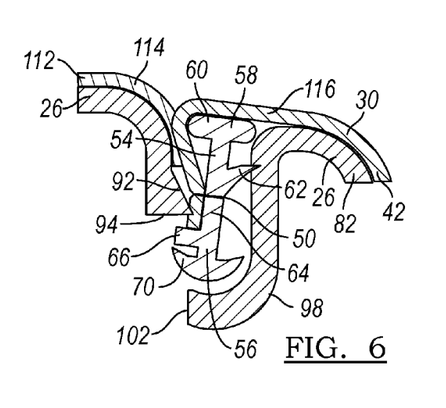
FIG. 6 illustrates a section view of the seat back and trim assembly along section 6-6 of FIG. 5.

Referring now to FIG. 5 and FIG. 6, a cross-section of the trim assembly 12 is shown with the trim retainer 44 inserted in the channel 80. FIG. 5 illustrates the section view along section 3-3 from FIG. 1 where the trim retainer 44 is inserted in the channel 80. In the locations where the retaining windows 84 and projections 92 are formed on an inside side wall 96, the retaining windows 84 and projections 92 cooperate with the finger 66 and anchor member 70. Alternatively, when the retaining windows 84 and projections 92 are formed on the outside side wall 98, the retaining windows 84 and projections 92 cooperate with the anchor member 70 or the rib 62. The anchor member 70 or the rib 62 cooperate with the retaining windows 84 and projections 92 by abutting the undercut 94. Likewise, the free end portion 74 abuts a B-surface 108 of the backboard 26 when inserted through the access opening 104, and the T-shaped feature 58 abuts the distal end wall 106 of the channel 80. The B-surface 108 is an interior surface of backboard 26 which is opposite the rear appearance surface 28 of the backboard 26. Since the B-surface 108 forms the interior surface, the B-surface does not need to have a quality finish appearance.

As further illustrated in FIG. 5, a surface 110 of the trim cover 30 is generally parallel with the appearance surface 112 of the backboard 26 so that the trim cover 30 and backboard 26 joined together form a generally continuous appearance surface of the trim assembly 12. The backboard 26 may be molded to have the appearance surface 112 appear the same as the surface 110 of the cover material portion 42. Alternatively, the backboard 26 may include trim material 114 bonded to the backboard 26 so that the trim material 114 is the generally the same as the cover material portion 42 of the trim cover 30. As such, the trim material 114 may be leather, vinyl, or any other suitable material or a material which is similar to the cover material portion 42.

FIG. 6 is a section view through section 6-6 in FIG. 5 illustrating the cross-section of the channel 80 when the trim retainer 44 is inserted in the channel 80. As illustrated in FIG. 6, the finger 66 and anchor member 70 cooperate with the undercut 94 formed by the retaining window 84 and the projection 92. The rib 62 acts to guide the trim retainer 44 as it is inserted into the channel 80. The rib 62 may also stabilize the trim retainer 44 to prevent unnecessary movement once the trim retainer 44 is inserted in the channel 80. The rib 62 also engages the outer side wall 98 to increase the retention of the trim retainer 44 to the channel 80. The rib 62 may be adapted to flex under a force try to pull the trim retainer 44 out of the channel 80, the rib 62 thereby cooperating with the channel to help secure the trim retainer 44 to the channel 80. The rib 62 may further bias the trim retainer 44 so that the finger 66 and the anchor member 70 remain mechanically engaged with the undercut 94.

As further illustrated in FIG. 6, the T-shaped feature 58 of the trim retainer 44 defines a generally flat region 116 along the cover material portion 42 adjacent the backboard 26 when the trim cover 30 is secured to the backboard 26. The flat region 116 may be generally parallel to the rear surface 28 of the backboard 26 so that the cover material portion 42 and the backboard 26 form a generally continuous appearance surface. The T-shaped feature 58 also makes the trim assembly 12 look like a one-piece surface instead of having a ridge or a groove in the transition area between the trim cover 30 and the backboard 26.

Figures 7, 8, 9:
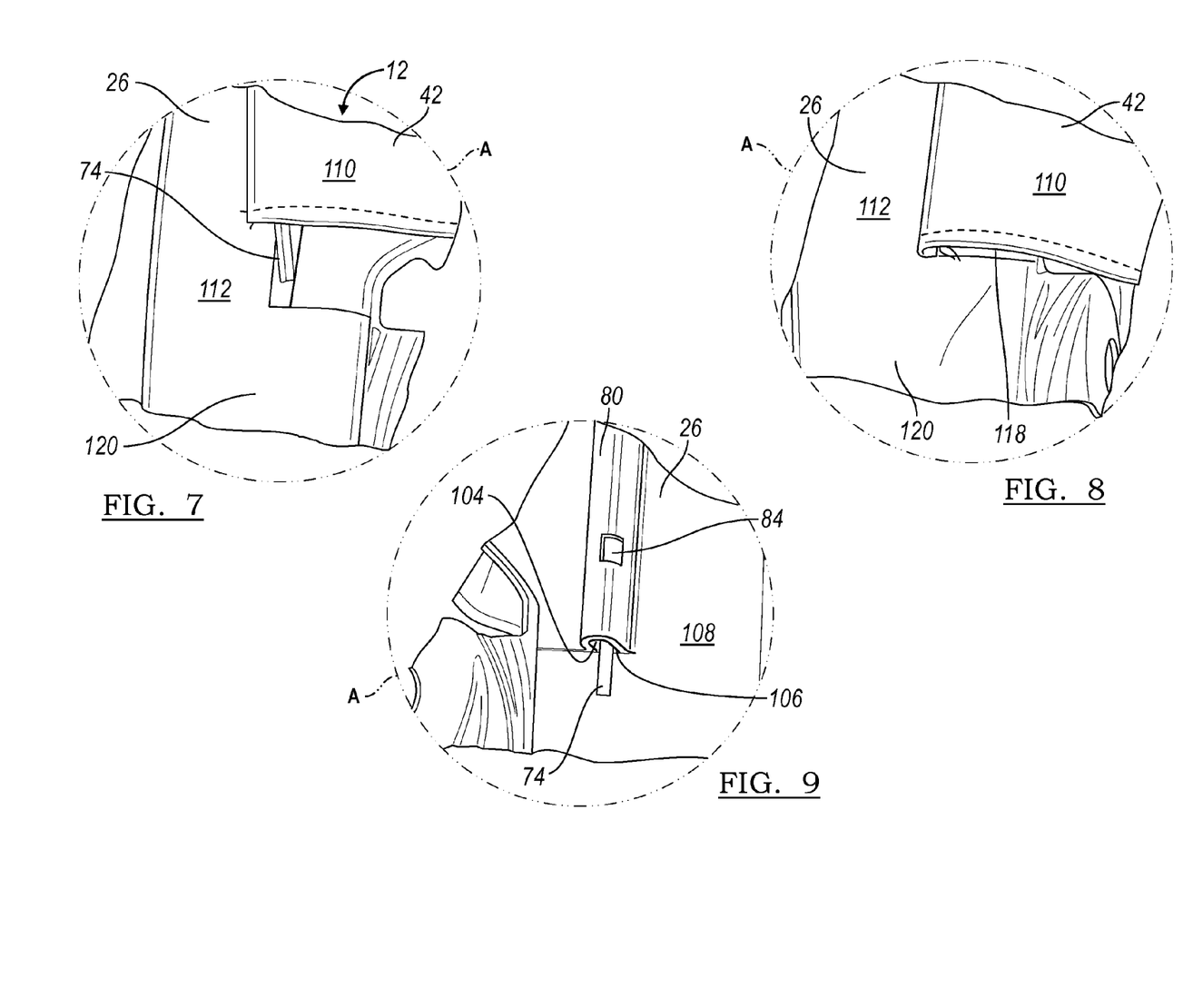
FIG. 7 illustrates an enlarged view of a portion A of the seat back and trim assembly according to FIG. 1.
FIG. 8 illustrates an enlarged view of a portion A of the seat back and trim assembly according to FIG. 1.
FIG. 9 illustrates an enlarged view of a portion A of the seat back and trim assembly according to FIG. 1 from inside the seat back.

As shown in more detail in FIGS. 7-9, an enlarged view of a portion of the trim assembly 12 along a lower region 120 of the seat back 14 from FIG. 1 is shown. The trim cover 30 is secured to the backboard 26 when the trim retainer 44 is aligned with the channel 80. First, the free end 74 is fed through the access opening 104. The elongate trim retainer 44 is then pressed into the channel 80 so that the engagement features cooperate with the retaining windows 84 and the projections 92 along the length of the channel 80. In one embodiment, as illustrate in FIG. 7, the free end portion 74 extend beyond a lower edge 118 of the cover material portion 42 so that the free end portion 74 may be easily inserted through the access opening 104.

In another embodiment, the channel 80 includes a pair of access openings 104 formed in opposing distal end walls 106 of the channel 80, each of the access opening 104 formed adjacent the lower region 120 of the seat back 14. First, a pair of free ends 74, each on opposite ends of the trim retainer 44, is fed through each of access openings 104. Then elongate trim retainer 44 is then pressed into the channel 80, starting at the lower region 120 of the seat back 14 and continually pressing the trim retainer 44 into the channel 80 around the periphery 82 of the backboard 26 so that the engagement features cooperate with the retaining windows 84 and the projections 92 along the length of the channel 80. The free end portions 74 are retained by the B-surface 108 of the backboard 26 when inserted through each of the access openings 104. Further, the T-shape feature 58 abuts each of the distal end walls 106 of the channel 80, thereby preventing the trim retainer 44 from sliding along the channel 80 and thereby being easily removed from the channel 80.

Figure 10A:
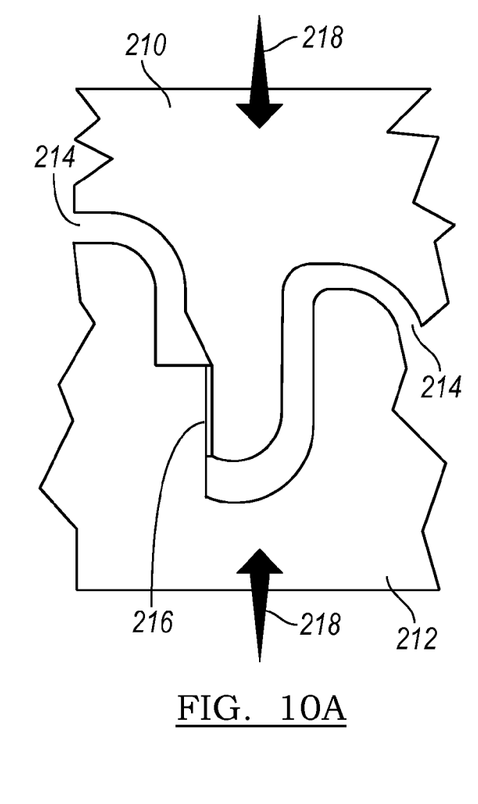
FIG. 10 illustrates a section view of a component of the trim assembly along section 4-4 of FIG. 1 and the method of manufacturing the component.
Figure 10B:
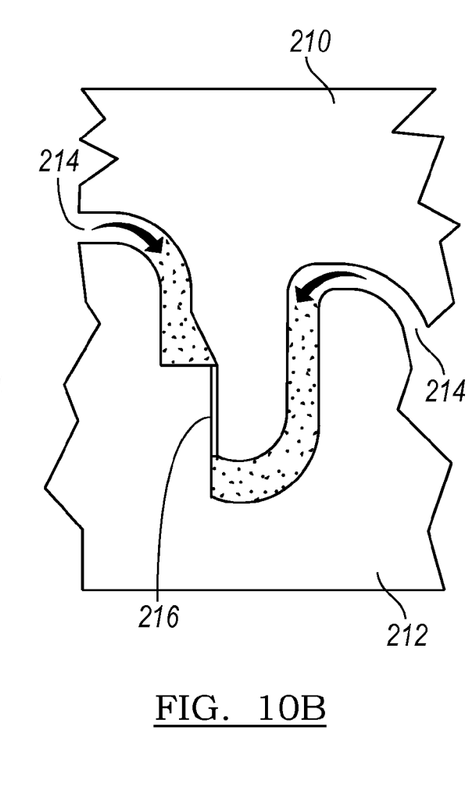
Figure 10C:
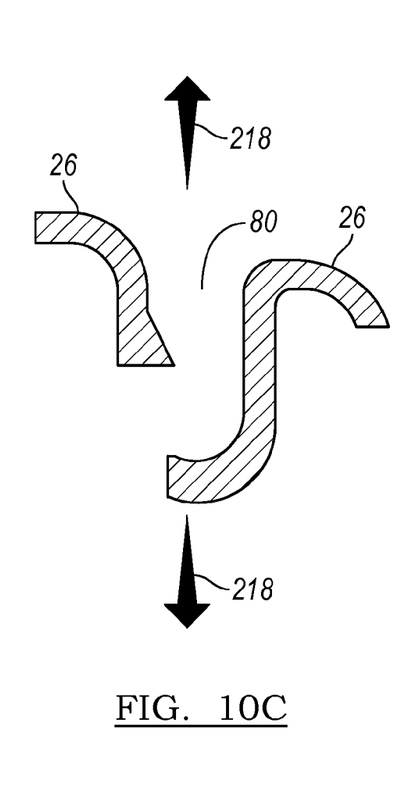

Turning now to FIG. 10, FIG. 10 illustrates a section view of the backboard 26 along section 4-4 of FIG. 3 and the method of manufacturing the backboard 26. The backboard 26 may be manufactured by injection molding. The injection mold 200 may be a mold having a first mold tool 210 and a second mold tool 212. When the first mold tool 210 and the second mold tool 212 close, the mold 200 forms a cavity 214 having a profile of the backboard 24 including the channel 80. Then molten plastic is injected into the cavity 124 to form the backboard 26. As the first mold tool 210 and the second mold tool 212 are opened, the backboard 26 is ejected.

The retaining windows 84 are formed along a parting line 216 of the first mold tool 210 and the second mold tool 212. In one embodiment, as illustrated in FIG. 10, the parting line 216 is generally parallel to the line of die draw 218, or in other words, the direction of movement of the first and second mold tools 210, 212. Further, the channel 80, including the retaining windows 84 and the projections 92, is formed in the line of die draw 218. By forming the retaining windows 84 and the projections 92 in the line of die draw 218, the first mold tool 210 and the second mold tool 212 may be simple, inexpensive molds without the need to create secondary sliders in the mold tools 210, 212.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A trim assembly for a seat back of a vehicle seat having a seat frame and a seat cushion, the trim assembly comprising:
    a backboard securable to the seat frame and adapted to form a rear surface of the seat back, the backboard having a channel formed therein and a plurality of retaining windows formed along a length of the channel at spaced apart locations; and
    a trim cover adapted to cover the seat cushion and form a front surface of the seat back, the trim cover having a cover material portion and a trim retainer connected to the cover material portion, the trim retainer having an engagement feature,
    wherein the trim retainer is insertable into the channel such that the engagement feature cooperates with the plurality of retaining windows for securing the trim cover to the backboard,
    wherein the channel includes a plurality of projections adjacent the plurality of retaining windows, and the engagement feature cooperates with the plurality of projections when the trim retainer is inserted into the channel, thereby preventing the trim retainer from being removed from the channel.

2. The trim assembly of claim 1 wherein the channel does not have an opening that extends along the length of the channel.

3. A trim assembly for a seat back of a vehicle seat having a seat frame and a seat cushion, the trim assembly comprising:
    a backboard securable to the seat frame and adapted to form a rear surface of the seat back, the backboard having a channel formed therein and a plurality of retaining windows formed along a length of the channel at spaced apart locations; and
    a trim cover adapted to cover the seat cushion and form a front surface of the seat back, the trim cover having a cover material portion and a trim retainer connected to the cover material portion, the trim retainer having an engagement feature,
    wherein the trim retainer is insertable into the channel such that the engagement feature cooperates with the plurality of retaining windows for securing the trim cover to the backboard,
    wherein the channel further comprises at least one end opening formed at a distal end of the channel; and the trim retainer further comprises a free end not joined to the cover material portion, the free end being adapted to be inserted through the end opening to secure the trim retainer to the backboard.

4. The trim assembly of claim 1 wherein the engagement feature extends along the length of the trim retainer and the trim retainer has a cross section with a first portion shaped to define the engagement feature, and a second portion shaped to define a T-shaped feature adapted to form a generally flat region along the cover material portion adjacent the backboard when the trim cover is secured to the backboard.

5. The trim assembly of claim 4 wherein the cover material portion is joined to the trim retainer at a location between the first portion and the second portion.

6. A vehicle seat assembly having a trim assembly comprising:
    a seat back frame adapted to be secured to a vehicle; and
    a cushion supported on the seat back frame and having a front surface;
    a backboard securable to the seat frame and adapted to form a rear surface of the seat back, the backboard having a channel formed therein and a plurality of retaining windows formed along a length of the channel at spaced apart locations; and
    a trim cover adapted to cover the cushion and form a front surface of the seat back, the trim cover having a cover material portion and a trim retainer connected to the cover material portion, the trim retainer having an engagement feature,
    wherein the trim retainer is insertable into the channel such that the engagement feature cooperates with the plurality of retaining windows for securing the trim cover to the backboard,
    wherein the backboard is secured to the seat back frame forming a rear surface of the vehicle seat assembly, and the trim cover covers the front surface of the cushion,
    wherein the plurality of retaining windows are formed along a least one side wall of the channel, the channel further comprising a pair of end openings formed at adjacent opposing distal ends of the channel; and the trim retainer further comprises a free end which is inserted through the end openings in order to secure the trim retainer to the channel and prevent the trim retainer from being removed from the channel once inserted.

7. The seat assembly of claim 6 wherein the channel extends along a periphery of the backboard.

8. The seat assembly of claim 7 wherein seat back frame is formed to integrally include a seat back portion and a head restraint portion, the backboard formed as one piece thereby forming the rear surface of the seat back portion and the head restraint portion.

9. The seat assembly of claim 7 wherein the channel includes at least one curvature portion along the periphery of the backboard.

10. The seat assembly of claim 7 wherein a distance between the retaining windows varies along the periphery of the backboard.

11. The seat assembly of claim 10 wherein a dimension of the retaining windows varies along the periphery of the backboard, wherein the distance between the retaining windows is at least twice the dimension of the retaining windows.

12. The seat assembly of claim 6 wherein the backboard has an appearance surface substantially similar to a surface of the cover material portion so that the backboard and the trim cover form a generally continuous seat trim appearance surface.

13. A trim assembly for a seat back of a vehicle seat having a seat frame and a seat cushion, the trim assembly comprising:
   a backboard securable to the seat frame and adapted to form a rear surface of the seat back, the backboard having a channel formed therein, the channel having a plurality of spaced projections formed along a length of the channel; and
   a trim cover adapted to cover the seat cushion and form a front surface of the seat back, the trim cover having a cover material portion and a trim retainer connected to the cover material portion, the trim retainer having an engagement feature,
   wherein the trim retainer is insertable into the channel such that the engagement feature cooperates with the projections for securing the trim cover to the backboard.

14. The trim assembly of claim 13 wherein the plurality of projections are formed along at least one side wall of the channel.

15. The trim assembly of claim 14 wherein each of the backboard includes a plurality of recesses formed in the side wall adjacent the projections, and the engagement feature cooperates with the projections and recess when the trim retainer is inserted into the channel, thereby preventing the trim retainer from being removed from the channel.

* * * * *